३,३६४,१९०
PROCESS FOR POLYMERIZING PROPYLENE TO SYNDIOTACTIC POLYPROPYLENE
Donald D. Emrick, Cleveland, Ohio, assignor to The Standard Oil Company, Cleveland, Ohio, a corporation of Ohio
No Drawing. Filed Apr. 27, 1964, Ser. No. 362,989
6 Claims. (Cl. 260—93.7)

This invention relates to a novel catalyst and method for the preparation of crystalline alpha-olefin polymers having a high degree of syndiotactic stereoregularity.

Prior to this invention, the preparation of a reasonably crystalline polypropylene with a high syndiotactic stereoregularity by means of a homogeneous catalyst system has not been disclosed.

The present invention involves the preparation of crystalline, syndiotactic homopolymers of alpha-olefinic hydrocarbons having from 3 to 8 carbon atoms by carrying the polymerization reaction out in an aromatic solvent media in the presence of a homogeneous or quasi-homogeneous catalyst comprising titanium trichloride, aluminum trichloride, a trialkyl aluminum having the structure $R_3Al$ wherein R represents an alkyl group having from 4 to 10 carbon atoms and a phosphorous-containing Lewis base at a temperature of from $-30$ to $+30°$ C. In addition to the foregoing requisites, the polymerization reaction may be carried out in the presence of molecular weight controlling materials such as hydrogen, dialkyl zinc, alkyl zinc halide or dialkyl cadmium compounds. Preferably, partial thermal cracking of the polymer may be used to lower the molecular weight. Other titanium trihalides such as the bromides and iodides as well as the vanadium trihalides can be used in place of titanium trichloride in this invention.

The catalyst employed in this invention is composed of finely divided violet titanium trichloride or vanadium trichloride, aluminum chloride, a trialkyl aluminum and a phosphorous-containing Lewis base. The catalyst is a homogeneous or highly dispersed material which may be used to polymerize alpha-olefins containing up to 8 carbon atoms. The use of an aromatic solvent and a polymerization temperature below about $30°$ C. have been found to be critical in determining the nature of the polymer produced by the process of this invention. The chain length of the alkyl groups in the trialkyl aluminum portion of the catalyst of this invention has also been found to be critical. It is preferred that the trialkyl aluminum component of the catalyst of this invention be a compound having the structure $R_3Al$ wherein each of the R's may be the same or different from the others and each R contains from 4 to 10 carbon atoms. The phosphorous-containing Lewis base compound of the catalyst may be an alkyl or aryl phosphine, phosphite or phosphoramide. Most preferred in this invention are the phosphines.

The catalyst of this invention preferably is composed of from 1.5 to 4 moles of trialkyl aluminum per mole of titanium trichloride or vanadium trichloride and from 0.25 to 1 mole of the phosphorous component per mole of the titanium trichloride component. It is also essential that the medium used in the preparation of the catalyst as well as the polymerization reaction medium contain from about 5 to 100% by weight of an aromatic hydrocarbon having at least 6 carbon atoms such as benzene, toluene, a xylene, naphthalene, and the like.

In the polymerization of propylene by the process and catalyst embodied herein, the product is a syndiotactic polypropylene having from about 10 to somewhat less than 50% crystallinity. The presence of syndiotactic structure in polypropylene prepared according to this invention is determined by the intensity of reflections in the X-ray diffractogram of the polymer at lattice distances of about 7.25 and 5.25 A. and a weaker reflection at a lattice distance of 3.6 A. However, correlations with physical properties may be obtained by measurements at 7.25 A. alone. The reflections at 5.25 A. are due not only to the syndiotactic structure, but also can be due to the isotactic configuration to some extent. The degree of syndiotactic structure in the polymers was determined by use of the following equation based on X-ray diffraction data:

$$\frac{\Sigma(d=7.3 \text{ A.})_{2.15}}{\Sigma(d=7.3 \text{ A.})_{2.15}+(d=6.3 \text{ A.})_{3.06}+(d=4.8 \text{ A.})_{6.98}}=1$$

for a polypropylene having 100% syndiotactic crystalline structure. The actual equation used in this invention is:

$$\frac{(d=7.3 \text{ A.})_{2.15}}{(d=7.3 \text{ A.})_{2.15}+(d=6.3 \text{ A.})_{3.06}+(d=4.8 \text{ A.})_{6.98}} \times 100 = S$$

wherein S denotes the syndiotactic index of the polymer. Determinations of infrared absorption spectral bands at 11.53 microns is also useful in determining the degree of syndiotactic crystallinity.

The syndiotactic polypropylenes prepared by the process of this invention are of appreciable molecular weight and crystallinity, and are tough materials having high impact strength. The stiffness and yield tensile strength increases with increasing degree of crystallinity and an elastomeric character is mostly associated with those products of lower degree of crystallinity. The polypropylenes of this invention are particularly useful in applications in which high elasticity or impact is required, such as in the construction of luggage containers and the like. Moreover, the syndiotactic polypropylenes embodied herein can be blended with conventional crystalline isotactic polypropylenes to improve impact resistance without causing blushing or crazing of the blend when the blend is bent or flexed.

Aromatic, alkyl aromatic and condensed aromatic solvents having from 6 to 14 carbon atoms such as benzene, toluene, xylene, ethyl benzene and the naphthalenes may be employed as the solvent medium in this invention. As was stated earlier, the nature of the solvent exerts an effect on the relative homogeneity of the catalyst and the subsequent formation of polymers having syndiotactic structure. When other factors are held constant, the use of aliphatic solvent media alone in the polymerization reaction produces an increase in reaction rate and a loss of syndiotacticity as is shown in the examples. This is not usually true with conventional Ziegler-Natta heterogeneous catalysts. It is also true that when only 7 weight percent of an aromatic hydrocarbon is added to an aliphatic hydrocarbon polymerization medium an increase in syndiotactic X-ray crystallinity index of nearly 50% takes place.

High surface area homogeneous or quasihomogeneous catalysts composed of 1 mole of $TiCl_3$ or $VCl_3$, 0.33 mole of $AlCl_3$ and 3 moles of $(C_6H_{13})_3Al$ were used in polymerization of propylene in toluene and various amounts of tributyl phosphine, triphenyl phosphite and hexamethyl phosphoric triamide in concentrations varying from 0 to 3 moles per mole of titanium. In comparison with catalyst systems having no added Lewis base, the addition of tributyl phosphine, triphenyl phosphite and hexamethyl phophoric triamide greatly increases the iso-octane insolubility of the crude polymer. Thus, in the absence of added Lewis base, typical crude polypropylene is only about 40 to 60% insoluble in hot iso-octane while polypropylenes prepared with tributyl phosphine are 80–92% insoluble in hot iso-octane.

The higher the alkyl chain length in the trialkyl aluminum compound, the higher the yield and the faster the polymerization rate. In aromatic polymerization media the degree of syndiotactic structure in the polymer increases with increasing chain length of the alkyl groups in the trialkyl aluminum.

The term "homogeneous" as used herein in reference to the polymerization catalysts means (1) the supernatant liquid above the centrifuged precipitate after about 10 minutes of centrifugation of the whole catalyst mixture at a speed of about 1000 r.p.m. in a centrifuge or (2) the supernatant liquid above the precipitate of a whole catalyst mixture which has been allowed to stand undisturbed for at least 15 to 30 minutes for 10 cm. of liquid height. The aforementioned precipitate is the "heterogeneous" phase of the catalyst. Although it is possible to prepare polypropylenes having considerable syndiotactic structure by employing the combined homogeneous and heterogeneous phases of the catalysts described above, it is preferred in the present invention to use only the homogeneous catalyst phase for the aforementioned reasons.

The invention is further illustrated in the following examples wherein the amounts of ingredients are expressed as parts by weight unless otherwise indicated.

Example I

A suspension of high surface area (HSA) violet titanium halide was prepared by mixing 4.0 mls. (6.90 g.; 0.0364 mole) of titanium tetrachloride with 650 ml. of pure Decalin at 60° C. This mixture was then mixed with 8.19 ml. of 1.49 M triethyl aluminum (in Decalin) under a nitrogen atmosphere and heating rapidly to 140° C. and then maintaining the mixture at 140–145° C. for 90 minutes followed by rapid cooling. A by-product of this reaction is aluminum chloride which ordinarily is left in the catalyst because it does not appear to have any adverse effect on the subsequent catalyst preparation and polymerization reactions.

Into a 1000 ml. stirred Parr autoclave fitted with an internal cooling coil and purged of all traces of air and moisture by means of pure nitrogen were placed 500 mls. of dry, sulfur-free toluene, 90 mls. of a 0.0542 molar Decalin suspension of HSA violet $TiCl_3 \cdot 0.33AlCl_3$ (0.00488 mole) described above, 18.7 mls. of 0.777 molar tri-n-hexylaluminum (in Decalin), and 5.25 ml. of 0.93 molar tributyl phosphine (in trimethylpentane). The resulting mixture was stirred under nitrogen at room temperature for one hour and was then heated momentarily to 70° C. (about 30 minutes being required), after which the mixture was cooled quickly to room temperature again. After excess nitrogen pressure was vented off, 120±10 p.s.i.g. of propylene pressure was applied to the reaction mixture and the polymerization was allowed to proceed at 25–30° C. for a period of 3.53 hours. A yield of 189.2 g. of crude dry polypropylene was obtained upon working up the product with isopropanol and 40:1 by volume isopropanol-concentrated hydrochloric acid mixture. The solid product was found to be 80% insoluble in boiling iso-octane.

Films of the highly elastomeric hot iso-octane soluble fraction displayed infrared $$\frac{A.\ 11.53\ microns}{A.\ \frac{1}{2}(2.32\mu + 2.35\mu)}$$

values of 0.5 after standing several days at room temperature, indicative of a high order of syndiotacticity according to Natta and Pegoraro, Rend. Accad. Nazl. Lincei, 34, 110 (8) (1963).

The hot iso-octane insoluble fraction was inhibited (0.5% level) and injection molded into bars of nominal dimensions of 5" x 0.50" x 0.13" and the plastic properties evaluated with the following result: 2822 p.s.i., yield tensile strength (2 in./min., Instron); 213% elongation (2 in./min., Instron); 62,800 p.s.i. flexural modulus of elasticity (0.05 in./min. at 2.0 in. span, Tinius Olsen); 2,820 p.s.i. flexural yield strength (0.05 in./min. at 2.0 in. span, Tinius Olsen); Izod impact strength greater than 7.42 ft. lb./in. notch; melting range 163–170° C.; 230° C. melt index about 0.05 g. in 10 min. (2.16 kg. wet.). Monoaxially oriented (130° C., Instron) these sheets displayed X-ray crystallinities of about 62% and infrared $$\frac{A.\ 11.53\ microns}{A.\ \frac{1}{2}(2.32\mu + 2.35\mu)}$$

micron values of nearly zero.

Example II

A catalyst prepared by the procedure of Example I in 500 ml. of toluene which was saturated with naphthalene, 0.0050 mole of $TiCl_3 \cdot 0.33AlCl_3$, 0.0150 mole of tri-n-hexyl aluminum and 0.0050 mole of tri-n-butyl phosphine was filtered through a filter bed of 1 cm. of oven dried Celite supported on a sintered glass filter. The homogeneous phase (filtrate) was added to a 1000 ml. Parr autoclave in the absence of air and a pressure of 125 p.s.i.g. of propylene was then applied in the autoclave and a reaction temperature of 25° C. was employed for about three hours. The polymer was worked up with isopropanol and a 40:1 by volume mixture of isopropanol-concentrated hydrochloric acid. The solid polymer was found to be about 30% crystalline and it was also found to have an X-ray syndiotactic index (S) of 32.4%. Similar results were obtained when vanadium trichloride was used in place of titanium trichloride in the foregoing procedure.

Example III

The procedure of Example II was repeated except that the whole catalyst was centrifuged at 1000 r.p.m. for about 10 minutes to isolate the homogeneous phase (supernatant liquid). The separated homogeneous phase was then used to polymerize propylene. The solid polymer after workup was found to be 33% crystalline and to have an X-ray syndiotactic index (S) of 24.9%. Excellent results were also obtained when the foregoing procedure was repeated using as polymerization medium a solution of 93% by weight of Isopar H (an isoparaffin mixture) and 7% by weight of naphthalene.

Example IV (A) The procedure of Example III was repeated using toluene as solvent for the polymerization. A polypropylene having 33% crystallinity and 15.7% X-ray syndiotactic index was isolated.

(B) The procedure of (A) of this example was repeated using as catalyst a mixture of 0.00481 mole of $TiCl_3 \cdot 0.33AlCl_3$, 0.01464 mole of tri-n-hexyl aluminum and 0.00488 mole of tri-n-butyl phosphine. The whole catalyst was used without the settling or centrifugation steps mentioned above. A yield of 60.1 g. of purified polypropylene was obtained which was found to be 29.5% crystalline and displayed an X-ray syndiotactic index of 4.16%.

(C) The procedure of (B) of this example was repeated using triethyl aluminum in place of tri-n-hexyl aluminum. In a polymerization time of 2 hours, 40 grams of purified polypropylene were obtained. The polypropylene was found to be 36% crystalline and displayed an X-ray syndiotactic index of 0.46%.

(D) The procedure of (C) of this example was followed except that the whole catalyst was centrifuged at 1000 r.p.m. for about 10 minutes and only the supernatant homogeneous liquid phase was used in the polymerization. In a two-hour polymerization a polymeric product (7.1 grams) was obtained which was found to be 59% crystalline and 0% syndiotactic.

I claim:

1. A process for preparing syndiotactic polypropylene comprising polymerizing propylene in an aromatic solvent medium at a temperature below about 30° C. in the presence of a catalyst comprising a trialkyl aluminum having the structure $R_3Al$ wherein R represents an alkyl group having from 4 to 10 carbon atoms, a trialkyl phosphine and an aluminum trihalide cocrystallized with a trihalide of an element selected from the group consisting of titantium and vanadium.

2. The process of claim 1 carried out at a temperature of from $-30$ to $+30°$ C.

3. The process of claim 2 wherein the trialkyl phosphine is tributyl phosphine.

4. The process of claim 3 wherein the element is titanium.

5. The process of claim 3 wherein the element is vanadium.

6. The process for preparing a syndiotactic polypropylene comprising polymerizing propylene in a solvent medium containing from about 15 to 100% by weight of an aromatic hydrocarbon having at least 6 carbon atoms in the presence of a homogeneous catalyst composed of from 1.5 to 4 moles of a trialkyl aluminum having the structure $R_3Al$ wherein R represents an alkyl group having from 4 to 10 carbon atoms, 0.25 to 1 mole of a trialkyl phosphine and one mole of a titanium trihalide cocrystallized with 0.33 mole of aluminum trihalide at a temperature of from $-30$ to $+30°$ C.

References Cited
UNITED STATES PATENTS

| 3,072,629 | 1/1963 | Coover et al. | 260—93.7 |
| 3,257,370 | 6/1966 | Natta et al. | 260—93.7 |
| 3,305,538 | 2/1967 | Natta et al. | 260—93.7 |

JOSEPH L. SCHOFER, *Primary Examiner.*

M. B. KURTZMAN, *Assistant Examiner.*